United States Patent [19]
Stinson, Jr. et al.

[11] Patent Number: 6,063,429
[45] Date of Patent: May 16, 2000

[54] METHOD OF MAKING A FOOD PRODUCT FROM CITRUS PULP

[75] Inventors: William S. Stinson, Jr.; Santiago M. Barros, both of Lakeland; Siu-Man Sheung, Winter Haven, all of Fla.; Sharon Stilwell, West Des Moines, Iowa

[73] Assignee: Florida Department of Citrus, Lakeland, Fla.

[21] Appl. No.: 09/235,037

[22] Filed: Jan. 21, 1999

[51] Int. Cl.⁷ .................................. A23L 2/02; A23L 1/29
[52] U.S. Cl. ..................... 426/616; 426/442; 426/443; 426/455; 426/456; 426/464; 426/599
[58] Field of Search .................... 426/616, 599, 426/442, 443, 455, 456, 464

[56] References Cited

U.S. PATENT DOCUMENTS

| | | |
|---|---|---|
| Re. 22,865 | 4/1947 | Vincent . |
| 1,045,849 | 12/1912 | Jefferies . |
| 1,389,389 | 8/1921 | Simpson . |
| 2,147,521 | 2/1939 | Bustamante . |
| 2,187,501 | 1/1940 | Lissauer . |
| 2,471,363 | 5/1949 | Vincent . |
| 2,510,679 | 6/1950 | Bruce . |
| 2,536,240 | 1/1951 | Vincent . |
| 2,548,510 | 4/1951 | Neal . |
| 2,650,881 | 9/1953 | Forkner . |
| 2,665,987 | 1/1954 | Baier . |
| 2,810,649 | 10/1957 | Bonnell . |
| 2,858,221 | 10/1958 | Laurie . |
| 2,929,719 | 3/1960 | Walburn . |
| 3,246,993 | 4/1966 | Webster . |
| 3,551,163 | 12/1970 | Vincent . |
| 3,966,984 | 6/1976 | Cocke et al. . |
| 3,998,977 | 12/1976 | Rabeler . |
| 4,205,093 | 5/1980 | Blake ...................................... 426/616 |
| 4,225,628 | 9/1980 | Lynn . |
| 4,232,049 | 11/1980 | Blake . |
| 4,232,053 | 11/1980 | Blake ...................................... 426/616 |
| 4,244,981 | 1/1981 | Blake . |
| 4,264,592 | 4/1981 | Xhajanka . |
| 4,267,196 | 5/1981 | Johnston . |
| 4,413,017 | 11/1983 | Loader . |
| 4,417,405 | 11/1983 | Fuller, Jr. . |
| 4,451,489 | 5/1984 | Beale et al. . |
| 4,477,481 | 10/1984 | Eisenhardt, Jr. et al. . |
| 4,497,838 | 2/1985 | Bonnell . |
| 4,675,195 | 6/1987 | Holton . |
| 5,132,127 | 7/1992 | Wisdom . |
| 5,162,128 | 11/1992 | Mills et al. ............................. 426/599 |
| 5,260,086 | 11/1993 | Downton et al. ....................... 426/599 |

*Primary Examiner*—Helen Pratt
*Attorney, Agent, or Firm*—Allen, Dyer, Doppelt, Milbrath & Gilchrist, P.A.

[57] ABSTRACT

A method for making a food product for human consumption includes the steps of reducing a particle size of pasteurized citrus pulp cells to a predetermined particle size distribution. The reduced-size cells are blended with a sweetener and a concentrate having a predetermined Brix level, and the blend is cooked until a desired moisture content is reached.

19 Claims, No Drawings

METHOD OF MAKING A FOOD PRODUCT FROM CITRUS PULP

BACKGROUND OF THE INVENTION

1. Field of the Invention

The present invention relates to food products produced from citrus, and, more particularly, to such food products produced from the pulp of citrus.

2. Description of Related Art

In the commercial manufacture of citrus juices, one of the products is pulp, a fibrous material that holds the juice in the fruit. Owing to the large concentration of pulp in the juice, excess pulp is removed by mechanical separation of the juice, typically by passing it through a screen having a desired perforation size.

The pulp can be used to recover additional juice solids through a series of washes. A majority of the washed or spent pulp is then typically used to manufacture cattle feed.

The pulp can also be mixed with a small quantity of juice, pasteurized, and utilized in the production of high-level pulp citrus juices.

Alternatively, the pulp can be added back into citrus beverages to impart visual appeal and texture.

Citrus pulp, however, has not found appreciable use as a food product for human consumption, despite the fact that it is known to contain nutrients. Among those inventions that do address attempts to use pulp in marketable foods include those of Laurie (U.S. Pat. No. 2,858,221), who teaches the use of pulp cells in a molded frozen product; Walburn (U.S. Pat. No. 2,929,719), who combines citrus varieties to form a puree; Blake (U.S. Pat. Nos. 4,224,981 and 4,232,053), who forms a nondairy aerated frozen dessert from pulp cells and also a comestible base to be used in jams or gels; and Loader (U.S. Pat. No. 4,413,017), who creates a chilled or frozen pudding-like product in combination with an acidified milk product.

SUMMARY OF THE INVENTION

It is therefore an object of the present invention to provide a process for making a food product from citrus pulp.

It is a further object to provide such a process for making an ingredient for a food product.

It is another object to provide a composition made from citrus pulp for human consumption.

It is an additional object to provide a nutritious snack for human consumption.

These and other objects are achieved by the present invention, the first aspect of which comprises a method for making a food product for human consumption. The method comprises the steps of reducing a particle size of pasteurized citrus pulp cells to a predetermined particle size distribution. The reduced-size cells are blended with a sweetener and a concentrate having a predetermined Brix level, and the blend is cooked until a desired moisture content is reached.

Another aspect of the present invention comprises a composition as made by the above-recited method.

The features that characterize the invention, both as to organization and method of operation, together with further objects and advantages thereof, will be better understood from the following.

DETAILED DESCRIPTION OF THE PREFERRED EMBODIMENTS

A description of the preferred embodiments of the present invention will now be presented.

A preferred embodiment of the method of the present invention comprises providing a pasteurized citrus pulp, such as, but not intended to be limited to, orange pulp. Preferably the pulp should contain 9–12°Brix (soluble solids) and a °Brix to percent acid ratio in a range of 12–15. The pulp should be packaged in a range of 800–1000 grams/liter and have a color typical of the respective citrus juice sacs (e.g., orange), with no evidence of scorching. The pulp should contain no seeds, except immature seeds that cannot be separated by currently known procedures. The pulp should be free from burnt, fermented, or other off-flavors or odors, and should contain a plate count on orange serum agar of less than 1000/ml reconstituted juice.

The first step in treating the pasteurized pulp cells comprises mixing unwashed pulp and milling or grinding it to a predetermined desired particle size distribution, which in a preferred embodiment comprises a range of 0.295–5 mm. The size reduction may be accomplished by hand milling or electrical grinding with a cutting head dimensioned to obtain the desired particle size, such as with a Comitrol Processor Model 1700 (Urschel Laboratory, Valparaiso, Ind.).

A sweetener and a 20°Brix concentrate are blended to a homogeneous state. The sweetener may comprise any or a combination of sweeteners known in the art, such as glucose, sucrose, honey, corn syrup, and fructose. The 20°Brix concentrate can be made prior to diluting any higher concentration of juice with water and/or juice. For example, one could blend 25.3 gallons of 65°Brix concentrate with 74.7 gallons of water to make 100 gallons of 20°Brix juice.

As an optional step, a flavor package such as a citrus flavor package or other natural flavor package may be added to the blend. Such an add-back may comprise 0.01–0.04%.

In addition, other spices such as ginger, cinnamon, allspice can be added, in addition to, or instead of, other fruit ingredients such as tropical fruit chunks.

The pulp cells are added to the concentrate/sweetener blend and gently mixed to a homogeneous state. This mixing may be accomplished by means known in the art, such as, for example, in a vessel with a motor and agitator, such as a scrape-surface-type agitator at 20 rpm.

A preferred composition of the mixture prior to mixing in additives comprises: pulp cell (57–62 wt %), 20°Brix orange concentrate (28–32 wt %), and sweetener (5–15 wt %).

Next the mixture is cooked at a temperature in a range of 165–212° F. until it has a moisture content in the range of 78–82%.

The mixture may be packaged in any of the ways known in the art. An exemplary packaging method includes filling serving cups at 175° F. and sealing immediately after filling. Preferably the mixture should have a texture ranging from pudding-like to apple sauce-like, depending upon the particle size of the pulp cells and the amount of added ingredients. Preferably the pH should fall in a range of 3.3–3.9.

The finished cooked product may be eaten as is or mixed with other foods or food ingredients. The product may be dried and eaten as a dehydrated fruit snack, or mixed with other food ingredients.

The product in a 4-oz, 113-g serving size has the following nutritional value: 10–15 mg vitamin C, 40 μg folate, and 3.0–3.5% total fiber and other nutrients.

It may be appreciated by one skilled in the art that additional embodiments may be contemplated, including similar methods and compositions based upon other fruits and/or vegetables.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for making a food product for human consumption comprising the steps of:

reducing a particle size of pasteurized citrus pulp cells to a predetermined particle size distribution;

mixing a sweetener and a citrus juice concentrate to a homogeneous state, the mixed concentrate and sweetener having a predetermined Brix level;

blending the reduced-size cells with the mixed sweetener and concentrate; and cooking the blend until a desired moisture content is reached.

2. The method recited in claim 1, wherein the particle size reducing step comprises milling the pulp to a particle size in the range of 0.295–5 mm.

3. The method recited in claim 1, wherein the sweetener comprises at least one substance selected from the group consisting of glucose, sucrose, honey, corn syrup, and fructose.

4. The method recited in claim 1, wherein the concentrate comprises citrus juice having a Brix level of approximately 20°.

5. The method recited in claim 1, wherein the blending step further comprises adding another natural flavor substance.

6. The method recited in claim 1, wherein the blending step comprises adding a spice.

7. The method recited in claim 6, wherein the spice comprises at least one spice selected from a group consisting of ginger, cinnamon, and allspice.

8. The method recited in claim 1, wherein the blending step comprises adding another flavor-enhancing ingredient.

9. The method recited in claim 8, wherein the flavor-enhancing ingredient is selected from a group consisting of fruit pieces and fruit ingredients.

10. The method recited in claim 1, wherein the blend prior to the cooking step comprises pulp cells in a concentration of approximately 57–62 wt %, 20°Brix orange concentrate in a concentration of approximately 28–32 wt %, and sweetener in a concentration of approximately 5–15 wt %.

11. The method recited in claim 1, wherein the cooking step comprises cooking the blend at a temperature in the range of 165–212° F.

12. The method recited in claim 11, wherein the desired moisture content is in the range of 78–82%.

13. The method recited in claim 1, further comprising the steps, following the cooking step, of distributing the cooked blend in a plurality of containers and sealing the containers.

14. The method recited in claim 1, wherein the cooked blend has a pH in a range of 3.3–3.9.

15. The method recited in claim 1, further comprising the step, following the cooking step, of dehydrating the cooked blend.

16. The method recited in claim 15, further comprising the step, following the dehydrating step, of mixing the dehydrated blend with another food product.

17. The method recited in claim 1, wherein the pasteurized pulp cells comprise a pulp containing a desired Brix level and a desired ratio of Brix level to percent acid.

18. The method recited in claim 17, wherein the desired Brix level comprises a level in the range of 9–12°Brix.

19. The method recited in claim 17, wherein the desired ratio comprises a value in the range of 12–15.

* * * * *